Patented Sept. 16, 1947

2,427,345

UNITED STATES PATENT OFFICE 2,427,345

COMPOUNDS OF THE NORPINANE SERIES AND METHOD OF MAKING

Joseph Paul Bain, Jacksonville, Fla., assignor, by mesne assignments, to The Glidden Company, Cleveland, Ohio, a corporation of Ohio No Drawing. Application January 6, 1944, Serial No. 517,218

5 Claims. (Cl. 260—489)

The present invention relates to new compounds of the pinene group, and to the production of the same.

In my copending application Serial No. 399,214, filed June 21, 1941, now Patent No. 2,340,294, there is described a new dicyclic primary alcohol and its esters, prepared by condensing nopinene with anhydrous formaldehyde at temperatures from about 100° C. to 250° C. either in the presence or absence of non-resinifying acid catalysts, such as acetic acid, zinc chloride, etc. The reaction was thought to be as follows:

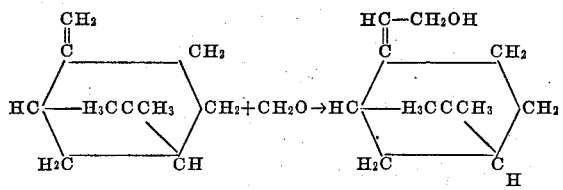

or

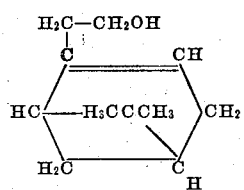

The alcohol has the following approximate characteristics:

B. P. at 10 mm_____° C__ 110-112
Refractive index ($N_D^{25}$)_____ 1.49-1.493
Density at 25° C_____ 0.963-0.964
Optical rotation $\alpha_D^{10cm}$____degrees__ −35 to −37

Since the product is prepared from nopinene and is an alcohol, it will be referred to as "nopol."

It, and certain of its derivatives may be considered as apopinane compounds, but since there is no established numbering system for apopinane applicant will herein consider the compounds as being substituted norpinane compounds, the numbering system for norpinane being:

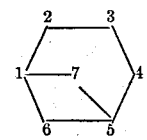

Norpinane

Beta pinene, according to this system is 6,6 dimethyl-2 methylene-norpinane, and nopol is B(6,6 dimethyl norpin-2-ene-2-) ethanol.

It has been found that the double bond of nopol may be hydrogenated to produce a new series of compounds of the pinane group. Such compounds do not exhibit the tendency to thermal isomerization shown by nopol and its esters. Also the new compounds do not in general exhibit the "pinene reactions" which are exhibited by nopol and its esters. The new compounds are therefore more stable. Primary terpene alcohols as well as terpene acid and aldehydes are useful in the medicinal, insecticidal and other fields and the stable products of the present invention are useful in such fields.

Example I

This example is illustrative of the preparation of nopol.

50 parts by weight of nopinene, 20 parts of paraformaldehyde, and 1 part of zinc chloride were heated at 80 to 120° C. The paraformaldehyde gradually dissolves in the course of several hours to give a clear solution. The crude nopol was distilled at 108–112° C. at 10 mm. pressure.

In another experiment 408 parts of nopinene and 60 parts of paraformaldehyde were heated in an autoclave at 200° C. for 3 hours. The crude alcohol was distilled under 10 mm. at 110–112° C.

Example II 322 grams of nopol was hydrogenated at 1000 to 1500 lbs./sq. in. pressure in the presence of 5 grams of Raney nickel catalyst at a temperature of 180–200° C. In 4.5 hours the alcohol had absorbed 44.1 liters of hydrogen and reduction was discontinued. The one double bond in this quantity of nopol theoretically requires the absorption of 43.4 liters of hydrogen.[1] The product was then fractionated at 10 mm. pressure. The yield of hydronopol, B(6,6-dimethyl norpinane-2) ethanol, was 270 g., or 80.5% of theoretical, having a boiling point at 10 mm. of 123–125° C.; $N_D^{25} = 1.4872$–$1.4878$, and optical rotation $$\alpha_D^{10cm.} = -27.53$$

The density of 25° C. was 0.961.

Example III 84 grams of hydronopol were refluxed with 150 grams of acetic anhydride. The formed acetic acid was fractionated off and the ester fractionated at 10 mm. An 83% yield was obtained of pure hydronopyl acetate having a boiling point at 10 mm. of 125–127° C., $N_D^{20}$ 1.4700–1.4708, and an optical rotation $\alpha_D^{10\,cm.} = -21.96$. The density at 25° C. was 0.976.

Example IV 56 grams of hydronopol were dissolved in glacial acetic acid. A cool solution of 55 grams of chromium trioxide in 400 cc. acetic acid and 50 cc. of water was gradually added, the solution being cooled to keep the temperature below 60° C. After the addition of the oxidizing agent was complete, the mixture was warmed to 75° C. and poured into water. This mixture was then extracted with several portions of ether and the ether extracted with 10% NaOH. The soap solution was then extracted with ether to remove neutral materials and acidified. The precipitated oily acid was extracted with ether and the ether solution evaporated. On cooling the residue crystallized to give a high yield of the crude hydronopic acid, 6,6, dimethyl norpinane-2-acetic acid. Recrystallization from aqueous methanol gave the pure acid having a melting point of 56–58° C. Neutral equivalent calculated for hydronopic acid, 182.25; found 182.8, 181.8.

Example V

Hydronopol was oxidized to the aldehyde by chromium trioxide in water solution at about 75° C. The alcohol, 168 parts, was stirred with 350 parts water containing 40 parts sulfuric acid. The temperature of the mixture was raised to 75° C. when 67 parts chromium trioxide in 100 parts water was added. After the reaction was complete the mixture was extracted with hexane and the extract fractionated at 10 mm. pressure. The fragrant aldehyde, 6,6, dimethyl norpinane-2-

[1] Calculated to standard conditions of temperature and pressure.

acetaldehyde, distilled at 95–100° C., $N_D^{25}$ 1.4805, alpha (10 cm. tube) $-13.5$. For purification it was shaken with a saturated solution of sodium bisulfite, the solid addition product formed was washed with hexane and dried. On dissolving the addition product in water and adding sodium carbonate the pure aldehyde was liberated. It yielded a semi-carbazone of melting point 161–161.5° C., $(alpha)^D - 19.0$ (2.0% in isopropanol).

Example VI

Three hundred and twenty-five parts by weight of hydronopol dissolved in 500 parts pyridine was treated slowly at about 50 to 60° C. with 260 parts thionyl chloride. After the addition of the thionyl chloride was complete the mixture was heated to about 100 to 110° C. for two hours. Water, heptane and hydrochloric acid was added to the product and the heptane solution of the desired product was separated and fractionated. The desired product, B(6,6-dimethyl norpinane-2) ethyl chloride distilled at 122 to 123° C. at 20 mm. pressure. The density of the product was 0.9993 at 25° C., the optical rotation $-29°$ (10 cm. tube) and the refractive index 1.4879 at 25° C. On analysis it was found to contain 19.03% chlorine.

Example VII

Thirty grams of sodium was dissolved in 500 cc. butanol and 95 grams hydronopyl chloride was added slowly and with agitation to the sodium butylate solution which was held near the boiling point. After addition of the chloride was complete the solution was refluxed for six hours to complete the reaction. The solution was then washed with water to remove suspended sodium chloride and excess alkali. The excess butanol was removed by fractionation and then the butyl ether of hydronopol was distilled, it boiled at 136 to 137° C. at 10 mm., the product weighed 87 grams. This product had a density of 0.8925 at 25°, an optical rotation of $-20.4$ (10 cm. tube) and refractive index 1.4663 at 19.3° C.

Example VIII

The ethers of hydronopol may be prepared according to the Williamson synthesis by first forming the sodium alcoholate of hydronopol and then reacting with an alkyl halide such as methyl or ethyl iodide to form the methyl and ethyl hydronopyl ethers.

It is thus seen that the present invention contemplates a new series of compounds, including 6,6, dimethyl compounds of the norpinane series also having a substituent group on the 2 carbon atom which contain a carbon-oxygen linkage involving the carbon atom B with respect to the number 2 carbon atom of the norpinane carbon structure. However, the nopol may be completely hydrogenated to the hydrocarbon.

The compounds contemplated by the present invention may, therefore, be broadly described as 6,6, dimethyl compounds of the norpinane series having a substituent group attached to the number two carbon atom of the nucleus said substituent group containing an uninterrupted carbon chain of at least two carbon atoms adjacent to the nuclear carbon atom.

The foregoing reactions are illustrated in the following scheme in which the alpha pinene structure of nopol is employed:

in which R is a radical selected from the group consisting of H, carboxylic acyl and lower alkyl.

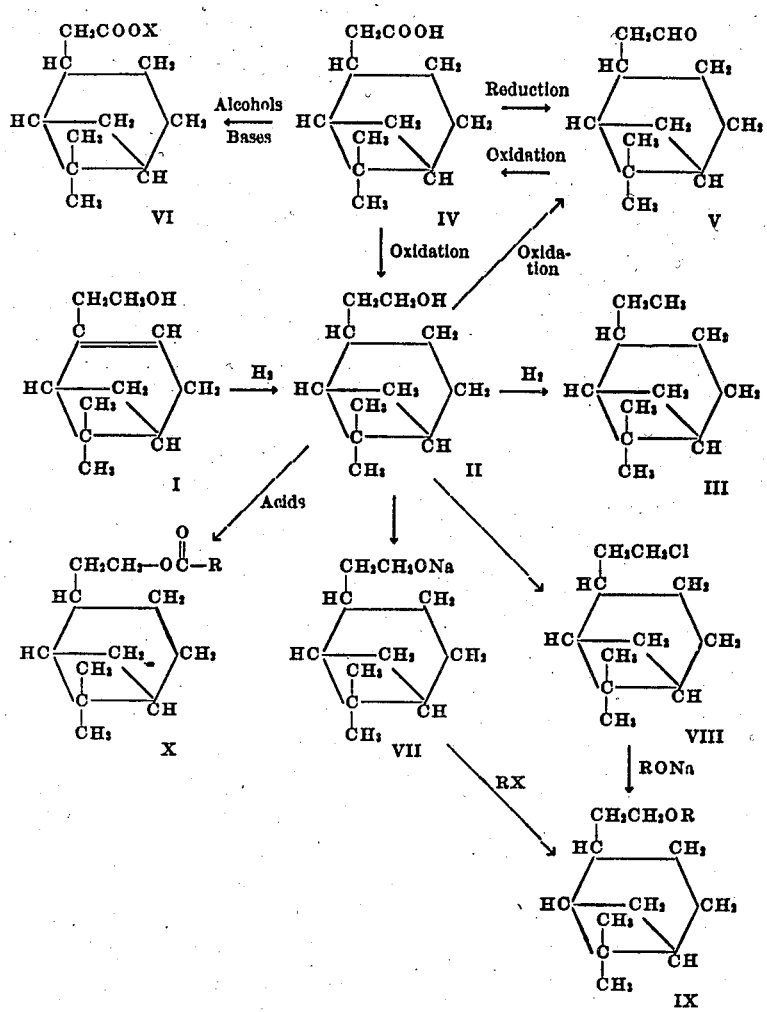

I. Nopol B(6,6 dimethyl norpin-2-ene-2) ethanol.
II. Hydronopol B(6,6-dimethyl-norpinane-2) ethanol.
III. 6,6 dimethyl-2-ethyl norpinane.
IV. 6,6 dimethyl norpinane-2-acetic acid.
V. 6,6 dimethyl norpinane-2-acetaldehyde.
VI. Esters and salts of IV.
VII. Alcoholate of II.
VIII. Hydronopyl chloride—B(6,6 dimethyl norpinane-2-) ethyl chloride.
IX. Ethers of II.
X. Esters of II.

Having described the invention what is claimed is:

1. The process which comprises hydrogenating the double bond of the dicyclic primary alcohol formed by condensing anhydrous formaldehyde with nopinene at a temperature of 100 to 225° C. whereby B(6,6 dimethyl norpinane-2-) ethanol is formed.

2. B(6,6 dimethyl norpinane-2-) ethanol.

3. A chemical compound having the formula:

$$H_2C-CH_2-OR$$

(structure)

4. A chemical compound as claimed in claim 3 wherein R is the acetyl radical.

5. A chemical compound as claimed in claim 3 wherein R is the butyl radical.

JOSEPH PAUL BAIN.

REFERENCES CITED

The following references are of record in the file of this patent:

UNITED STATES PATENTS

| Number | Name | Date |
| --- | --- | --- |
| 1,755,752 | Ulffers | Aug. 22, 1930 |
| 2,232,433 | Borglin | Feb. 18, 1941 |
| 2,209,911 | Bruson | July 30, 1940 |
| 2,309,017 | Schantz | July 19, 1943 |
| 659,640 | Blackmore | Oct. 16, 1900 |

(Other references on following page)

FOREIGN PATENTS

| Number | Country | Date |
|---|---|---|
| 18,049 | Great Britain | 1908 |
| 306,385 | Great Britain | Jan. 10, 1930 |
| 80,711 | Germany | Mar. 27, 1895 |
| 203,848 | Germany | Nov. 4, 1908 |
| 16,180 | Great Britain | 1914 |
| 213,251 | Great Britain | June 17, 1925 |
| 258,901 | Great Britain | July 28, 1927 |
| 311,085 | Great Britain | May 9, 1929 |
| 654,550 | France | Apr. 8, 1929 |
| 714,183 | France | Nov. 9, 1931 |
| 4,649 | Great Britain | 1911 |

OTHER REFERENCES

Anschutz, Jour. Pr. Ch., vol. 159, pp. 264–272 (1941). (Copy Sci. Lib.)

Prins, "Proceeding of the Acad. of Sci. Amsterdam," vol. 22 (1919), pp. 51 to 56 (260—631.5)

Ushakov, "Zhurnal Prikladnoi Khim," vol. 3 (1930), pp. 65 to 67. (Copies in Lib. of Congress.)

Arbuzov, Jour. Gen. Chem. U. S. S. R., vol. 9, pp. 249–54. (Bur. Standards Lib.)

Brooks, "The Non-Benzenoid Hydrocarbons" (1922), p. 445. (Copy in Div. 6.)

"The Terpenes," Simonsen, vol. II (1932), pp. 178, 179, and 180. (Copy in Div. 6.)